(12) United States Patent
Frohne et al.

(10) Patent No.: US 9,027,606 B2
(45) Date of Patent: May 12, 2015

(54) UNDERWATER CONDUIT FOR FLUID TRANSPORT

(75) Inventors: Christian Frohne, Hannover (DE); Ketil Opstad, Gralum (NO); Jon-Arne Hall, Sarpsborg (NO)

(73) Assignee: Nexans, Paris (FR)

( * ) Notice: Subject to any disclaimer, the term of this patent is extended or adjusted under 35 U.S.C. 154(b) by 390 days.

(21) Appl. No.: 13/107,292

(22) Filed: May 13, 2011

(65) Prior Publication Data

US 2012/0018027 A1    Jan. 26, 2012

(30) Foreign Application Priority Data

Jul. 21, 2010 (EP) ..................... 10305803

(51) Int. Cl.
*F16L 9/14* (2006.01)
*F16L 11/16* (2006.01)
*F16L 11/08* (2006.01)
*F16L 59/153* (2006.01)

(52) U.S. Cl.
CPC ............... *F16L 11/16* (2013.01); *F16L 11/083* (2013.01); *F16L 59/153* (2013.01)

(58) Field of Classification Search
USPC ......... 138/121, 140, 173, 129, 122, 134, 135, 138/137
See application file for complete search history.

(56) References Cited

U.S. PATENT DOCUMENTS

| | | | |
|---|---|---|---|
| 3,165,123 A * | 1/1965 | Hawkins .......................... | 138/37 |
| 5,485,870 A * | 1/1996 | Kraik ............................. | 138/122 |
| 5,715,870 A * | 2/1998 | Winter et al. .................. | 138/121 |
| 5,778,940 A * | 7/1998 | Tucker et al. .................. | 138/127 |
| 5,813,439 A * | 9/1998 | Herrero et al. ................. | 138/134 |
| 6,053,213 A * | 4/2000 | Jung et al. ...................... | 138/130 |
| 6,065,501 A * | 5/2000 | Feret et al. ..................... | 138/134 |
| 6,354,333 B1 * | 3/2002 | Dupoiron et al. ............. | 138/135 |
| 6,415,825 B1 * | 7/2002 | Dupoiron et al. ............. | 138/127 |
| 6,807,988 B2 * | 10/2004 | Powell et al. ................. | 138/125 |
| 6,926,039 B2 * | 8/2005 | Marion ......................... | 138/134 |
| 6,981,526 B2 * | 1/2006 | Glejbol et al. ................ | 138/129 |
| 6,983,769 B2 * | 1/2006 | Arima et al. .................. | 138/121 |
| 7,004,203 B2 * | 2/2006 | Claussen et al. ............. | 138/149 |
| 7,104,285 B2 * | 9/2006 | Furuta ........................... | 138/121 |
| 7,445,029 B2 * | 11/2008 | Kamiyama ................... | 138/127 |

(Continued)

FOREIGN PATENT DOCUMENTS

WO        0036324       6/2000
WO    WO 2008017868 A2 *  2/2008

*Primary Examiner* — Donnell Long
(74) *Attorney, Agent, or Firm* — Sofer & Haroun, LLP

(57) ABSTRACT

A pipe for underwater transportation of fluid is indicated which includes a pressure-tight metal inner pipe for conducting the fluid, wherein for its stabilization in radial direction at least one profiled metal strand and for stabilizing in the axial direction at least one tension-proof strand are wound around the inner pipe. The inner pipe (1) is a metal pipe which is corrugated transversely of its longitudinal direction and which for stabilization in the radial direction is surrounded by at least one first radial reinforcement (3) which is composed of a profiled helically extending profile strip whose windings are placed closely next to each other or engage each other and are hooked together. Arranged around the first radial reinforcement (3) is arranged a metal pipe corrugated transversely of its longitudinal direction as the outer pipe (5); at least two layers of tension-proof strands (7, 8) are wound around the outer pipe (5), preferably with oppositely directed pitch.

8 Claims, 2 Drawing Sheets

(56) References Cited

U.S. PATENT DOCUMENTS

| | | | | |
|---|---|---|---|---|
| 7,781,040 | B2* | 8/2010 | Coyle | 428/36.91 |
| 7,946,313 | B2* | 5/2011 | Vo | 138/135 |
| 8,439,603 | B2* | 5/2013 | Witz et al. | 405/169 |
| 2004/0194838 | A1* | 10/2004 | Glejbol et al. | 138/134 |
| 2005/0011572 | A1* | 1/2005 | Belcher | 138/137 |
| 2007/0125438 | A1* | 6/2007 | Hardy et al. | 138/129 |
| 2010/0229992 | A1* | 9/2010 | Witz et al. | 138/109 |
| 2011/0017337 | A1* | 1/2011 | Kagoura | 138/121 |

* cited by examiner

UNDERWATER CONDUIT FOR FLUID TRANSPORT

RELATED APPLICATION

This application claims the benefit of priority from European Patent Application No. 10 305 803.8, filed on Jul. 21, 2010, the entirety of which is incorporated by reference.

BACKGROUND

1. Field of the Invention

The invention relates to a pipe for a pipe line for underwater conveyance of a fluid which includes a pressure-tight metal inner pipe for conducting the fluid, wherein at least one profiled metal strand for its mechanical stabilization in radial direction and for stabilization in axial direction at least one tension-proof strand are wound around the inner pipe, wherein an intermediate layer each of insulating material is placed between the individual layers of metal elements (WO-A-00/36324).

2. Description of Related Art

Pipes of this type are used, for example, as moveable pipes for the transportation of oil, gas or water between moveable and/or stationary arrangements of oil or gas conveying plants which interact with corresponding platforms built in the ocean. Such pipes must bear radial loads which are caused as a result of the pressure of the oil inside the pipe, on the one hand, and, on the other hand, by the external pressure of the ocean water which acts on the pipe particularly in greater depths of more than 1,000 m. They must also be resistant against tensile loads acting in the axial direction.

Known from the above mentioned WO-A-00/36324 is a reinforced pipe with an inner pipe constructed as so-called carcass which is a helically mound from a profiled metal strip whose windings are in engagement with each other so as to be hooked together. Placed above the carcass is a smooth layer of a polymer for sealing purposes which is surrounded by two U-shaped profiled inter-engaging strips. Two layers of steel wires are wound over the strips as tension-proof elements which are surrounded by a plastic sheath. The carcass may easily be clogged by the oil, so that its bending capability and, thus, the bending capability of the pipe are impaired. In addition, deposits can form which lead to contamination as "old oil," The layer provided for sealing is, because of the properties of the polymer, not diffusion tight against aggressive components of the fluid to be transported which could damage the layers located outside of this layer by corrosion.

OBJECTS AND SUMMARY

The invention is based on the object of further developing the above-described pipe in such a way that a problem-free transportation of a fluid can be ensured and additionally an effective protection against ocean water is achieved.

In accordance with the invention, this object is net in that the inner pipe is a metal pipe which is corrugated transversely of its longitudinal direction the inner pipe is surrounded by at least one first radial reinforcement for stabilization in the radial direction, wherein the radial reinforcement is composed of a profiled helically extending strip whose windings are placed close together or engaging each other and hooked together, a metal pipe corrugated in its longitudinal direction is placed as an outer pipe around the radial reinforcement, and at least two layers of tension proof strands are wound around the outer pipe, preferably with oppositely directed pitches.

The inner pipe and the outer pipe of this pipe are metal pipes which are corrugated transversely of their longitudinal direction. They are manufactured, for example, using conventional technology from a longitudinally incoming metal strip which is deformed into a pipe with a slit extending in the longitudinal direction; the slit is subsequently welded so that a pipe is obtained which is closed circumferentially. A corrugation is finally pressed in, wherein the corrugation may extend helically or annularly. The corrugation improves the bending capability of the respective metal pipe and simultaneously the pipe can absorb higher radial loads. The inner pipe and the outer pipe can consist basically of any chosen metal which can be processed in the manner described above. Advantageously, they are of high-grade steel.

The radial reinforcement present in the pipe is of a profiled strip, advantageously of metal, which is helically wound around the inner pipe. The profiled strip is preferably wound with a low pitch which equals, for example, the profile width. Its profile is constructed in such a way that its windings are either placed closely together or are in inter-engagement with each other and are hooked together as a result. Both versions result in a pipe-like configuration. Such a reinforcement, also called carcass, is known, for example, as a cable protection pipe.

Accordingly, the inner pipe of this pipe is tight as a circumferentially closed metal pipe relative to the fluid to be transported, so that it cannot become clogged and contaminated. In addition, a diffusion of aggressive components of the fluid toward the outside is prevented by the inner pipe. The first radial reinforcement surrounding the inner pipe provides the pipe with a high transverse stability, so that the pressure produced by the fluid moving in the inner pipe can have no effect. The outer pipe is also a circumferentially closed metal pipe, so that the structures within the outer pipe are protected against the ocean water. The two tension-tight strands ensure the tensile strength of the pipe even in the case of greater lengths.

Embodiments of the subject matter of the invention are illustrated in the drawings.

DETAILED DESCRIPTION

Figure 1:
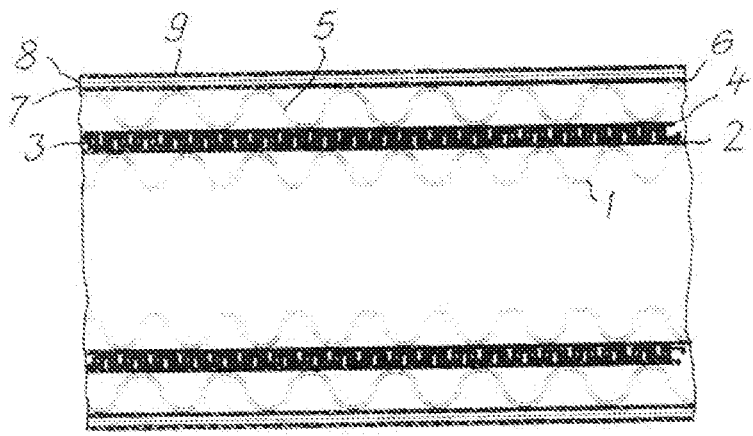
FIG. 1 shows a pipe according to the invention, partly in section.

In the drawings, for simplicity's sake, only short sections of the pipe according to the invention are shown which illustrate the structural elements of the pipe.

The pipe according to FIG. 1 includes an inner pipe 1 which is constructed as a metal pipe which is corrugated transversely in its longitudinal direction. It is preferably composed of high-grade steel. The inner pipe 1 is surrounded by a first radial reinforcement 3 with the intermediate arrangement of a separating layer 2 of insulating material. Placed over the first radial reinforcement 3 is once again a separating layer of 4 of insulating material against which is placed as the outer pipe 5 a metal pipe which is corrugated transversely of its longitudinal direction. The outer pipe 5 is surrounded by two layers of tension-proof strands 7 and 8 with the intermediate arrangement of an insulating layer 6 serving for stabilizing the pipe, wherein the strands 7 and 8 are preferably of metal, especially of steel, or of aramide. Placed over the strand 8 of the outer layer is a layer 9 of insulating material. Advantageously, a separating layer of insulating material is placed between the strands 7 and 8. The two strands 7 and 8 are preferably wound around their respective supports with oppositely directed pitch. It is also possible to place more than two tension proof strands over the outer pipe 5.

Figure 2:
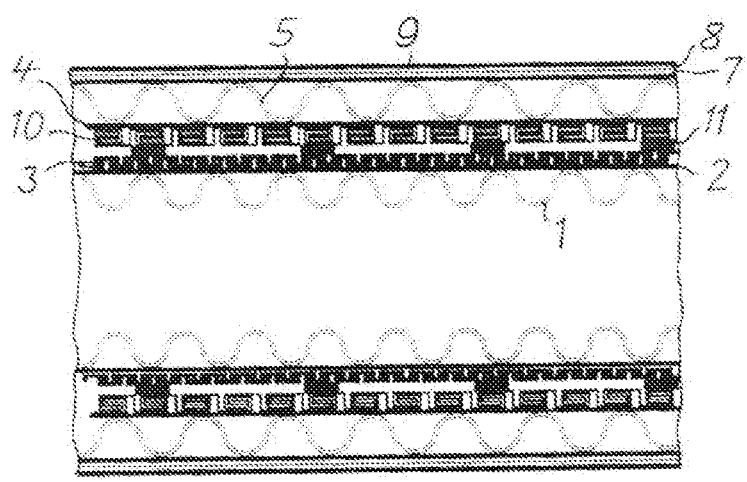
FIGS. 2 to 5 show further developed embodiments of the pipe of FIG. 1.

In accordance with FIG. 2, for a further radial stabilization and for improving the thermal insulating property of the pipe, a second radial reinforcement 10 can be mounted concentrically around the first radial reinforcement 3, wherein the second radial reinforcement 10 is separated from the first radial reinforcement 3 by an only schematically illustrated spacer member 11.

Figure 3:
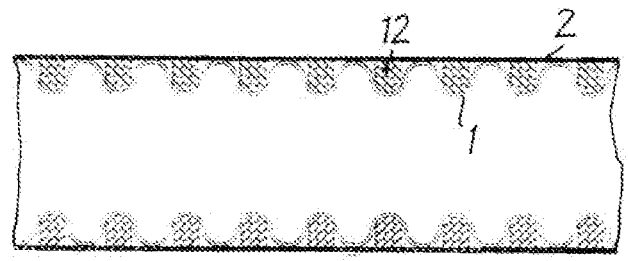

In accordance with FIG. 3, the inner pipe 1 can additionally be supported by the profiled body 12 which rests against the layer 2 of insulating material and protrudes into the valleys of the corrugation of the inner pipe 1 with contact therewith. The profiled body 12 is advantageously of a pressure and tension proof material, such as a fiber-reinforced synthetic material or of metal. The profiled body 12 should have good sliding properties relative to the metal inner pipe 1. In the case of a helically wound inner pipe 1, only a profiled body 12 is inserted, which is then constructed as a helical member. In the case of an annularly corrugated inner pipe 1, for each valley of the corrugation an individual profiled body is required, so that the profited body 12 then is composed of a plurality of profiled members. In the case of this embodiment of the pipe, it may be useful if such a profiled body is arranged only in each second or third valley.

Figure 4:
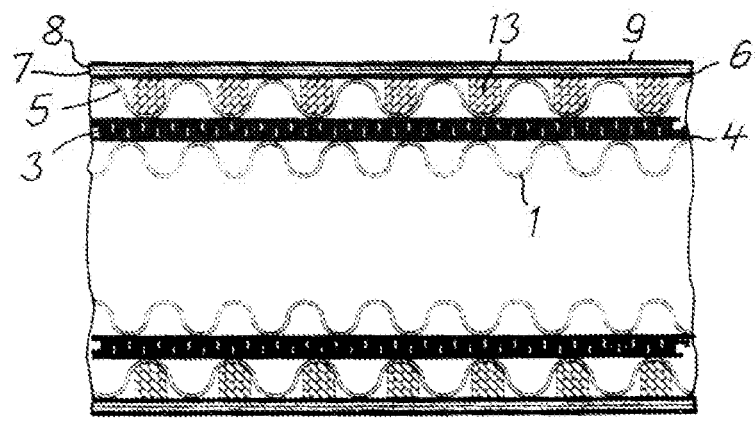

Corresponding to the embodiment of the pipe according to FIG. 4, the outer pipe 5 can also additionally be supported by a profiled body 13 which may be constructed as the profiled body 12. It rests against the layer 6 of insulating material and protrudes into the valleys of the outer pipe 5 with contact therewith.

Figure 5:
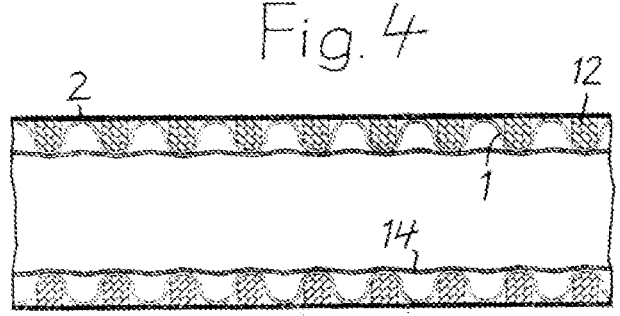

In accordance with FIG. 5, a hose 14 of insulating material may be arranged in the inner pipe 1 for lining inner pipe 1, also called "liner." For the pressure equalization with the hollow space located between the inner pipe 1 and the hose 14, the hose 14 may be perforated by providing holes along its entire length.

The invention claimed is:

1. Pipe for a pipe line for underwater conveyance of a fluid comprising:
 a pressure-tight metal inner pipe for conducting the fluid which is corrugated transversely of its longitudinal direction;
 an intermediate layer of insulating material is placed over said inner pipe;
 at least one radial reinforcement disposed over said insulating material, said radial reinforcement constructed as a profiled metal strand for mechanical stabilization of said inner pipe in radial direction and for stabilization of said inner pipe in an axial direction
  wherein said east one first radial reinforcement is composed of a profiled helically extending strip whose windings are placed close together or engaging each other and are hooked together,
 a metal pipe corrugated in its longitudinal direction is placed as an outer pipe around the radial reinforcement, and
 at least two layers of tension proof strands are wound around the outer pipe.

2. Pipe according to claim 1, wherein the first radial reinforcement is surrounded by a second radial reinforcement with the intermediate arrangement of a spacer member.

3. Pipe according to claim 1 further comprising a hose of insulating material mounted in the inner pipe for lining the inner pipe.

4. Pipe according to claim 3, wherein the hose is perforated over its entire length.

5. Pipe according to claim 1, wherein the at least two tension-proof strands are embedded between first and second outside layers of insulating material.

6. Pipe according to claim 1, wherein a profiled body is provided for engaging from the outside in grooves of the corrugation of said inner pipe between an outside diameter of said inner pipe and an inside diameter of said intermediate layer of insulating material for support purposes.

7. Pipe according to claim 1, wherein at least two layers of tension proof strands are wound around the outer pipe with oppositely directed pitches.

8. Pipe according to claim 1, wherein a profiled body is provided for engaging from the outside in grooves of the corrugation of said outer pipe between an outside diameter of said second outer pipe and an inner diameter of said first outside layer of insulating material for support purposes.

\* \* \* \* \*

UNITED STATES PATENT AND TRADEMARK OFFICE
CERTIFICATE OF CORRECTION

PATENT NO. : 9,027,606 B2
APPLICATION NO. : 13/107292
DATED : May 12, 2015
INVENTOR(S) : Frohne et al.

It is certified that error appears in the above-identified patent and that said Letters Patent is hereby corrected as shown below:

Claims

Column 4, Claim 1, Line 14: The word "east" between the words "said" and "one" should read "at least".

Column 4, Claim 1, Line 18: The words --relative to-- should be inserted between the words "corrugated" and "its" and the word "in" should be omitted.

Column 4, Claim 8, Line 41: "Claim 1" should read as "Claim 5".

Column 4, Claim 8, Line 42: The word "for" between the words "provided" and "engaging" should read as "from".

Signed and Sealed this
Eighth Day of September, 2015

Michelle K. Lee
*Director of the United States Patent and Trademark Office*